No. 119,750. Patented Oct. 10, 1871.
David B. Eberly.
Cultivator.
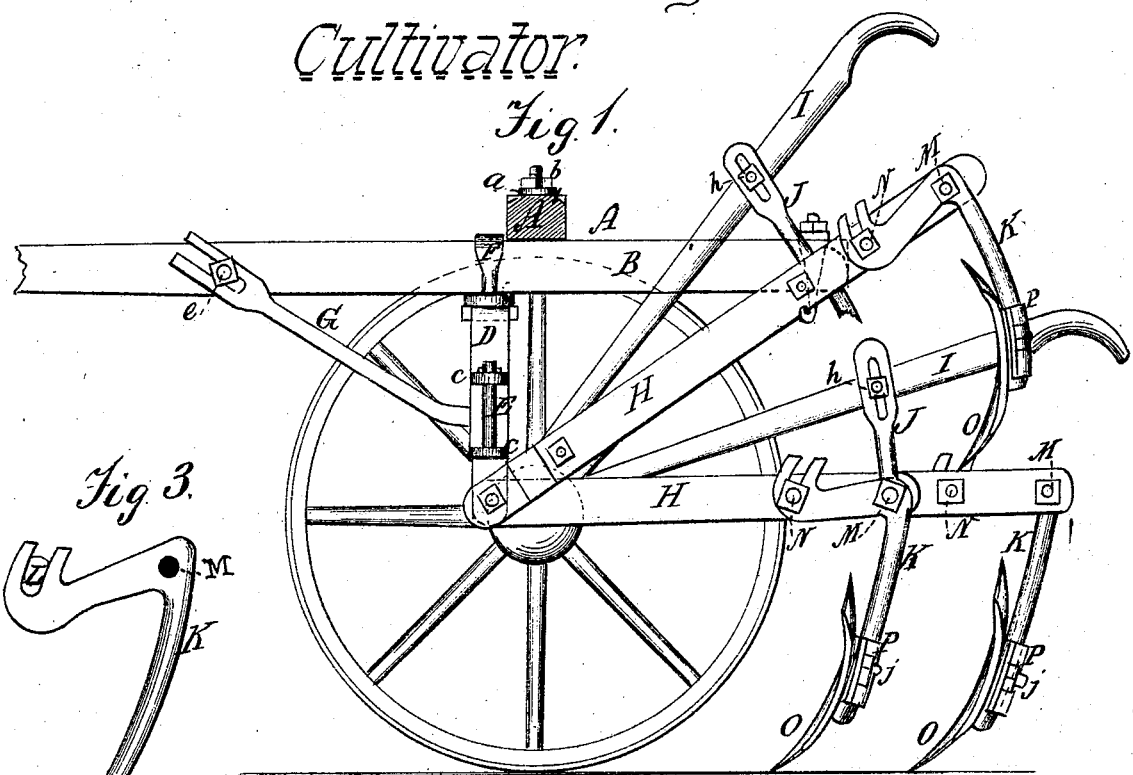
Fig. 1.
Fig. 3.
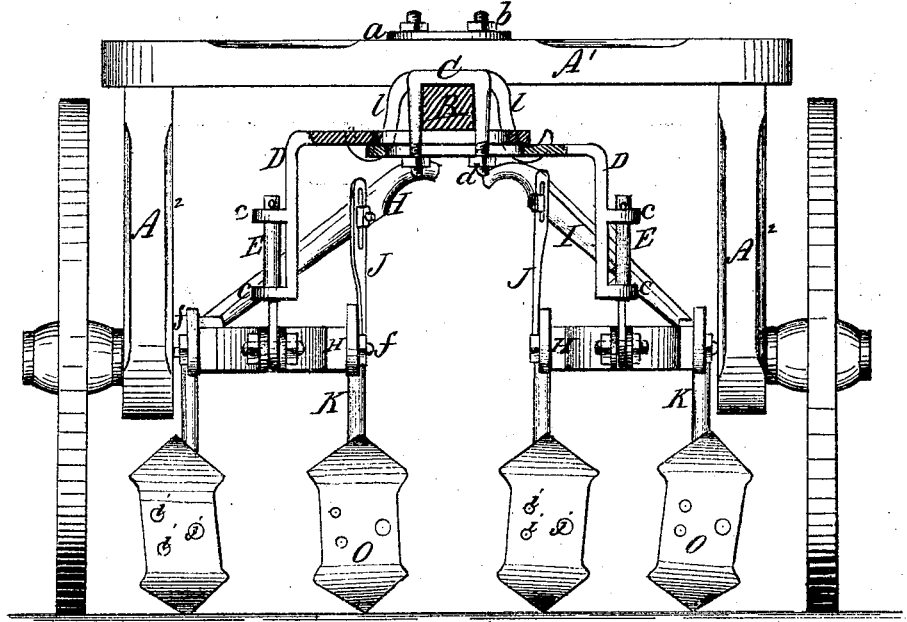
Fig. 2.
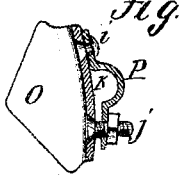
Fig. 4.
Witnesses
A. Ruppert
Harry Cox
Inventor
David B Eberly
by Theodore Mengen
his Attorney
AM. PHOTO-LITHOGRAPHIC CO. N.Y. (OSBORNE'S PROCESS.)

119,750

UNITED STATES PATENT OFFICE.

DAVID B. EBERLY, OF PINE VILLAGE, INDIANA.

IMPROVEMENT IN CULTIVATORS.

Specification forming part of Letters Patent No. 119,750, dated October 10, 1871.

*To all whom it may concern:*

Be it known that I, DAVID B. EBERLY, of Pine Village, in the county of Warren and State of Indiana, have invented certain new and useful Improvements in Cultivators; and I do hereby declare the following to be a full, clear, and exact description of the same, reference being had to the accompanying drawing making part of this specification, in which—

Figure 1 is a side elevation with part of the axle and one of the wheels removed. Fig. 2 is a front view, showing the tongue in section. Fig. 3 is a perspective view of the curved angular shank, and Fig. 4 is a plan view of the double-pointed shovel and spring-cap.

My invention relates to certain improvements in cultivators; and consists: First, of a double-pointed shovel provided with a spring-cap secured at one side by rivets and at the other by a screw-bolt to the back of the double-pointed shovel in such a manner that the shovel may be adjusted on the shank, set, and secured at any desired angle. Secondly, of a curved angular shank provided with a slot in its upper end, secured to the plow-frame by two screw-bolts, one near the vertex of the angle of the shank, the other in the slot aforesaid, the whole being so arranged that the shank will keep the shovel in position when used in arable soil, but will permit it to yield when it meets an obstruction. Thirdly, of the combination and arrangement of the several parts hereinafter described.

In the drawing, A is the axle, composed of the beam $A^1$ and the uprights $A^2$, the axle-boxes being at the lower end of the uprights $A^2$. The axle A is secured to the tongue B by a loop, C, provided with a plate, $a$, and nuts, $b$. D D are slotted angular arms, provided with journal boxes $c$ at their lower ends, in which the perpendicular journals E have their bearings. The arms D D are secured to the tongue B by a loop, F, provided with nuts and screws $d$. The arms D D are stayed by braces G G, slotted at their front ends, secured by a screw-bolt, $e$, to the tongue B, and also by bolt to the arms D D. The distance between the journals E E can be regulated by loosening the nuts $d\ d$ and the screws-bolt $e$ and sliding the arms D D and braces G G, as desired. Two plow-frames, H H, consisting each of a long and a short beam placed parallel to each other and connected properly by stay-rods $f$ and spools $g$, are secured by bolts to the lower ends of the journals E E. Each frame, H, is provided with a plow-handle, I, made adjustable by a screw-bolt, $h$, passing through a slotted standard, J, into the plow-handle I. K is the curved angular shank having the slot L in its upper end. A screw-bolt, M, passes through the beam of the plow-frame, and also through the shank K near the vertex of its angle. A screw-bolt, N, also passes through the slot L and the beam of the plow-frame. The lower portion of the shank K is of round iron while the upper portion is flat. The double-pointed shovel O is provided with a spring-cap, P, secured to the back thereof by the rivets $i\ i$ and the screw-bolt $j$. The lower portion of the shank K is slightly curved forward, its point inserted into the opening $k$ made for its reception between the shovel-point O and the spring-cap P. The shovel O can be set at any angle desired, and firmly secured there by tightening the nut on the screw-bolt $j$. The shank K turns on the screw-bolt M, permitting its point to swing back and forth. The screw-bolt N is made sufficiently tight to hold the shank firmly when the plow is used in arable soil, and yet not so tight as to prevent it from swinging back when the shovel O meets an obstruction. By this arrangement the shank and plow are prevented from being broken when they strike an obstruction. Hooks $l\ l$ are placed at the rear end of the tongue B for riding the plows when not in use. By the arrangement of the loop C, plate $a$, and nuts $b$, and loop F and nuts and screws $d$, the axle A and arms D D can be shifted upon the tongue B so as to throw the weight of the plow where desired.

Having thus described my improvements, what I claim as new and useful, and desire to secure by Letters Patent, is—

1. The device formed by the shovel O provided with the spring-cap P, the standard K having a vertical and horizontal portion with an open slot, L, at its front end, pivoted at M and clamped at N, in combination with the beam H, constructed to operate as hereinbefore described.

2. The slotted angular arms D D, loop F, with nuts and screws $d$, slotted braces G G, perpendicular journals E E, and plow-frames H H, arranged relatively one to the other, as and for the purpose hereinbefore set forth.

3. In combination with the double-pointed shovel O, the spring-cap P secured thereto by the rivets *i i*, and screw-bolt *j*, for the uses and purposes hereinbefore set forth.

In testimony that I claim the foregoing improvements in cultivators as above described I have hereunto set my hand and seal.

DAVID B. EBERLY. [L. S.]

Witnesses:
ABRAHAM HAUN,
ALONZO P. ROWEN.   (43)